(No Model.)  2 Sheets—Sheet 1.
A. W. HALL.
MECHANICAL TELEPHONE.

No. 336,640. Patented Feb. 23, 1886.

Witnesses:
Emil H. Certer.
Henry McBride.

Inventor:
A. Wilford Hall
by his attys
Brown & Hall (No Model.) 2 Sheets—Sheet 2.

A. W. HALL.
MECHANICAL TELEPHONE.

No. 336,640. Patented Feb. 23, 1886.

Witnesses.
Emil Herta.
Henry McBride.

Inventor.
A. Wilford Hall
by his attys
Brown & Hall

UNITED STATES PATENT OFFICE.

A. WILFORD HALL, OF NEW YORK, N. Y.

MECHANICAL TELEPHONE.

SPECIFICATION forming part of Letters Patent No. 336,640, dated February 23, 1886.

Application filed July 6, 1885. Serial No. 170,669. (No model.)

*To all whom it may concern:*

Be it known that I, A. WILFORD HALL, of the city and county of New York, in the State of New York, have invented a new and useful Improvement in Mechanical Telephones, of which the following is a specification.

My invention is applicable to what are commonly known as "acoustic" or "mechanical" telephones, in which the vibrations of sound are transmitted mechanically through diaphragms and a wire or coil extending between them or connected with them.

Certain features of my invention relate to the employment, in one mechanical instrument, of two diaphragms and connections between one diaphragm and the wire, whereby longitudinal vibrations are transmitted to and received from the wire, and connections between the other diaphragm and the wire, whereby lateral vibrations are transmitted to and received from the wire.

Another feature of my invention relates to the employment, with a transmitting-wire and a diaphragm, to which the end thereof is hitched, of a sound-tube for conducting vibrations to operate on the diaphragm in a direction opposite to the longitudinal pull or tension of the wire, whereby the sound-vibrations are caused to act more effectively on the diaphragm.

The invention also relates to other novel combinations of parts hereinafter described and pointed out in the claims.

Figure 1:
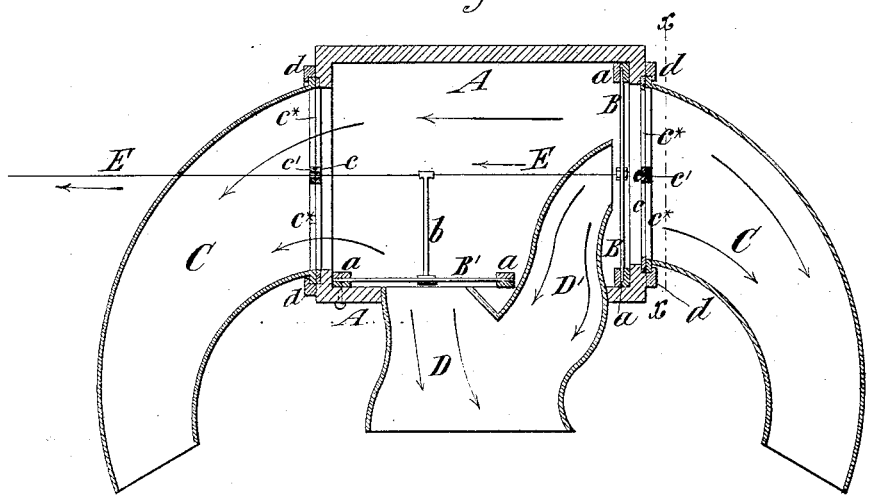
Figure 2:
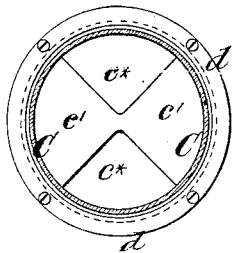
Figure 3:
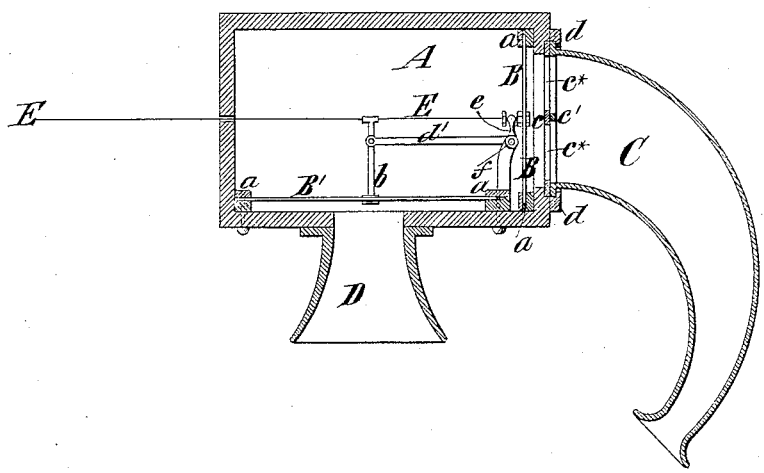

In the accompanying drawings, Figure 1 illustrates a telephone apparatus embodying my invention, and having one diaphragm arranged in a plane transverse to the length of the wire and hitched thereto, and a second diaphragm arranged in a plane approximately parallel with the wire and connected therewith. Fig. 2 is a section upon the plane of the dotted line $x$ $x$, Fig. 1, showing a valve or damper, whereby the sound-tube may be cut off from communication with the hitch-diaphragm; and Fig. 3 is a sectional view similar to Fig. 1, illustrating a modified form of instrument, which also embodies my invention.

Similar letters of reference designate corresponding parts in the several figures.

A designates a box or case of suitable size, having secured in one end a diaphragm, B, and in one of its sides at right angles to the diaphragm B a second diaphragm, B'. To the opposite ends of the box A are connected sound-conducting tubes C, and to the front thereof, opposite the second diaphragm, B', is attached a mouth-piece or tube, D.

E designates the transmitting-wire, which is suitably connected to the center of the diaphragm B, and is stretched between this diaphragm and the diaphragm of the corresponding instrument or apparatus located at the other end of the line. These diaphragms B B' may be of any suitable material ordinarily employed in making diaphragms for acoustic telephones, and are carried or clamped between flanges $a$, provided on the inner side of the box or case A, as clearly shown in Fig. 1. The diaphragm B, inasmuch as it is to receive a constant strain from the transmitting-wire E, should be of sufficiently strong and thick material for this purpose, but the diaphragm B', inasmuch as it is not subjected in any way to the strain of the transmitting-wire E, may be of very much lighter and thinner material, and therefore very much more sensitive to the impact of sound waves or vibrations.

It will be observed that the mouth-piece D is divided or has a branch, D', leading to the inner side of the diaphragm B, and when the sender of a message talks into the mouth-piece D, the vibrations of sound act upon both diaphragms B B' and transmit both lateral and longitudinal vibrations through the wire to the receiving apparatus at the other end of the line. When the instrument is used as a receiver, the diaphragm B receives and gives out the longitudinal vibrations of the wire, and all lateral vibrations are conveyed to the listener through the diaphragm B'.

When the line and apparatus are set up for use, it will be observed that the tensile strain upon the transmitting-wire E exerts a pull upon the diaphragm B, in a direction indicated by the arrow in Fig. 1, and therefore tends to deflect the diaphragm in that direction.

The branch D' of the mouth-piece is presented at what is here the inner side of the diaphragm within the box A, and when the mouth-piece is spoken into the sound-vibrations act upon the diaphragms B in a direction exactly opposite the longitudinal tension or pull of the wire, and hence produce much stronger vibrations of the diaphragm.

When using the instrument for sending a message, it becomes desirable to close the passage through the sound-tubes C, whereby vibrations are conducted to the ears, and for this purpose I have represented dampers or valves between the sound-tubes C and the box A. As here represented, a plate or disk, $c$, is fixed across the opening in the box, and a second plate or disk, $c'$, is attached to the inner end of the sound-tube C. Each sound-tube has an outwardly-projecting flange, which turns in a circular rabetted flange, $d$, attached to the box, and the disks $c\,c'$ are provided with openings $c^*$, which are brought into positions coincident with each other by the turning of the tubes C into the positions shown in Fig. 1, and are moved out of positions coincident with each other by the turning of the tubes C through a quarter of a circle, and into a position wherein they are projected upward from the box A. Instead of this ordinary form of disk-valve or damper for controlling communication between the tubes C and the box, a valve or damper of any other desired form may be employed.

When a message is received through the apparatus shown, the valves $c\,c'$ are opened and sound-waves pass from the outer or right-hand side of the diaphragm B through the tube C at that end of the instrument, and from the left-hand or inner side of the diaphragm B through the tube C at the other side of the instrument, and through the mouth-piece D'. The lateral vibrations which are received by the diaphragm B' are transmitted from the inner side of that diaphragm through the left-hand sound-tube C, and from the outer side of that diaphragm B' through the mouth-piece D, as indicated by the arrows in Fig. 1. In this way the sound-vibrations from both sides of both diaphragms are transmitted to the listener, inasmuch as the tubes C and the mouth-piece D are all presented in the same direction, and because the mouth will not be applied to the mouth-piece when receiving a message.

In the example of my invention shown in Fig. 3 the box or case A has diaphragms B B', arranged and secured therein substantially as before described, with the sound-tube C extending from the end of the box at which is the diaphragm B and a mouth-piece, D, arranged opposite the diaphragm B'. It also has valves $c\,c'$, of the same or any other suitable construction, whereby the sound-tubes C can be cut off from and placed in communication with the box A, and this instrument also has a rod or connection, $b$, whereby the diaphragm B' is connected with the transmitting-wire E. I have in this example of the invention represented the rod or connection $b$ between the diaphragm B' and the wire E as connected with the diaphragm B by a lever, $d'\,e$, which is fulcrumed at $f$ in the box A. The shorter arm, $e$, of this lever is connected with the diaphragm B, while the longer arm, $d'$, which is preferably several times the length of the shorter arm, is connected with the rod $b$.

It will be observed that by means of the lever $d'\,e$ the diaphragm B is actuated by the vibrations of the diaphragm B' when talking into the mouth-piece D, and this lever serves the same purpose as the branch D' of the mouth-piece shown in Fig. 1, the purpose of both the lever and branch mouth-piece D' being to conduct and impart to the diaphragm B vibrations in a direction opposite to the tension upon the transmitting-wire E. The lever $d'\,e$ therefore constitutes the full equivalent of the branch mouth-piece D'.

By both the arrangements described the wire E receives both longitudinal and lateral vibrations when talking into the mouth-piece D D', and both the longitudinal and lateral vibrations of the wire are transmitted through the two diaphragms B B' to the listener when the apparatus is used for receiving a message.

What I claim as my invention, and desire to secure by Letters Patent, is—

1. The combination, with a transmitting-wire, of two diaphragms, connections between one diaphragm and the wire, whereby longitudinal vibrations are transmitted to and received from the wire, and connections between the other diaphragm and the wire, whereby lateral vibrations are transmitted to and received from the wire, substantially as herein described.

2. The combination, with a transmitting-wire and a diaphragm, to which the end thereof is hitched, of a sound-tube for conducting vibrations to operate on the diaphragm in a direction opposite to the longitudinal tension or pull of the wire, substantially as herein described.

3. The combination, with a transmitting-wire and two diaphragms, to one of which the wire is hitched, and a connection between the other diaphragm and the wire through which lateral vibrations will be transmitted to and received from the wire, whereby the longitudinal and lateral vibrations will be taken up, respectively, by the two diaphragms and sound-tubes, whereby both systems of vibrations, from the sides of the two diaphragms, will be conveyed simultaneously to the listener, substantially as herein described.

4. The combination, with a transmitting-wire and two diaphragms, one serving to receive lateral vibrations and the other longitudinal vibrations from the wire, of sound-tubes arranged to convey the vibrations from both sides of each diaphragm to the listener, substantially as herein described.

5. The combination, with a transmitting-wire and a diaphragm arranged transversely thereto, and to which the wire is hitched, and which is of sufficient thickness and strength to bear the strain, of a second diaphragm, lighter and more flexible than the hitch-diaphragm, and a connection between the lighter diaphragm and the wire, and through which lateral vibrations will be transmitted to and received from the wire, whereby both longitudinal and lateral vibrations will be simultaneously transmitted to and received from the wire, substantially as herein described.

A. WILFORD HALL.

Witnesses:
FREDK. HAYNES,
HENRY MCBRIDE.

Correction in Letters Patent No. 336,640.

It is hereby certified that in Letters Patent No. 336,640, granted February 23, 1886, upon the application of A. Wilford Hall, of New York, New York, for an improvement in "Mechanical Telephones," an error appears in the printed specification requiring correction, as follows: In line 11, page 1, the word "coil" should be stricken out and the word *cord* inserted instead; and that the said Letters Patent should be read with this correction therein that the same may conform to the record of the case in the Patent Office.

Signed, countersigned, and sealed this 2d day of March, A. D. 1886.

[SEAL.]

H. L. MULDROW,
*Acting Secretary of the Interior.*

Countersigned:
M. V. MONTGOMERY,
*Commissioner of Patents.*